US008866462B2

(12) United States Patent
Luo et al.

(10) Patent No.: US 8,866,462 B2
(45) Date of Patent: Oct. 21, 2014

(54) MINIMUM ENERGY POINT TRACKING BUCK CONVERTER

(75) Inventors: Ping Luo, Chengdu (CN); Shaowei Zhen, Chengdu (CN); Xiang Geng, Chengdu (CN); Ye Zhang, Chengdu (CN); Yajuan He, Chengdu (CN); Bo Zhang, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 13/637,230

(22) PCT Filed: Feb. 28, 2011

(86) PCT No.: PCT/CN2011/071375
§ 371 (c)(1),
(2), (4) Date: Sep. 25, 2012

(87) PCT Pub. No.: WO2012/109804
PCT Pub. Date: Aug. 23, 2012

(65) Prior Publication Data
US 2013/0320946 A1 Dec. 5, 2013

(30) Foreign Application Priority Data
Feb. 18, 2011 (CN) .......................... 2011 1 0040743

(51) Int. Cl.
*H02M 3/157* (2006.01)
*H02M 3/158* (2006.01)
*H02M 1/00* (2006.01)

(52) U.S. Cl.
CPC ...... *H02M 3/157* (2013.01); *H02M 2001/0025* (2013.01); *H02M 3/158* (2013.01)
USPC .......................................... 323/283

(58) Field of Classification Search
USPC ................... 323/205–211, 275, 281–285, 351
See application file for complete search history.

(56) References Cited

U.S. PATENT DOCUMENTS

| 7,501,804 | B2 * | 3/2009 | Vo ................................ 323/282 |
| 7,557,552 | B2 * | 7/2009 | Vo ................................ 323/282 |
| 7,602,164 | B2 * | 10/2009 | Vo ................................ 323/282 |
| 7,855,536 | B2 | 12/2010 | Sumita |
| 8,076,920 | B1 * | 12/2011 | Melanson ..................... 323/299 |
| 8,093,757 | B2 * | 1/2012 | Wolfs ............................. 307/75 |

(Continued)

FOREIGN PATENT DOCUMENTS

| CN | 101252311 | 8/2008 |
| WO | WO 2006/086651 | 8/2006 |

*Primary Examiner* — Adolf Berhane
(74) *Attorney, Agent, or Firm* — Caesar, Rivise, Bernstein, Cohen & Pokotilow, Ltd.

(57) ABSTRACT

This invention involves with a low power IC (Integrated Circuit) with high energy efficiency. This invention describes a Buck converter that can track the minimum energy point of the load. It works by estimating input energy of every sensing period, taking advantage of energy consumption curve of IC in sub-threshold. Energy estimation is implemented with counting conducted pulses, while maintaining constant input energy of each pulse by regulating output voltage and ON time with digital control circuit. With digital control circuit, minimum energy point can be tracked with a lookup table stored inside. Most of this invention's control circuit is digital, with benefits of low power consumption and small chip area.

10 Claims, 3 Drawing Sheets

(56) References Cited

U.S. PATENT DOCUMENTS

| | | | |
|---|---|---|---|
| 8,433,530 B2* | 4/2013 | Shimada et al. | 702/62 |
| 2007/0103122 A1* | 5/2007 | Morong et al. | 323/205 |
| 2008/0055940 A1* | 3/2008 | Lawson et al. | 363/16 |
| 2009/0237057 A1 | 9/2009 | Dishman et al. | |
| 2011/0062784 A1* | 3/2011 | Wolfs | 307/77 |
| 2012/0043923 A1* | 2/2012 | Ikriannikov et al. | 320/103 |
| 2012/0169240 A1* | 7/2012 | Macfarlane | 315/152 |
| 2013/0147441 A1* | 6/2013 | Lee et al. | 320/167 |

* cited by examiner

MINIMUM ENERGY POINT TRACKING BUCK CONVERTER

CROSS-REFERENCE TO RELATED APPLICATIONS

This national stage application claims the benefit under 35 U.S.C. §371 of International Application No. PCT/CN2011/071375 filed on Feb. 28, 2011, entitled MINIMUM ENERGY POINT TRACKING BUCK CONVERTER, which takes its priority from Chinese Patent Application No. 201110040743.8 filed on Feb. 18, 2011, and all of whose entire disclosures are incorporated by reference herein.

TECHNIQUE AREA

This invention involves with low power consumption IC (Integrated Circuit), especially a digital IC working in sub-threshold region, implemented in Buck converter with high energy efficiency.

BACKGROUND OF THE INVENTION

Integrated voltage regulator circuits usually include an Output Unit and a Regulating Unit. The input voltage is chopped by the Output Unit of switching power supply circuit into pulses, which is then transferred to the load after filtered. The Regulating Unit senses and regulates the output voltage. PSM (Pulse Skip Modulation) is often adopted in switching power supply circuit. The strategy of PSM control is that the output of a comparator determines this pulse skipped or not to regulate the output voltage by sampling the output voltage and comparing with the output reference voltage. PSM is based on CFCW (Constant Frequency Constant Width). Pulse will be skipped when output voltage is higher than reference voltage. Otherwise, output voltage is stable under CFCW control. At the same time, with energy module under PSM control, the input energy can be constant by manipulating output voltage and duty cycle. It is the fundamental of MEPT system tracking load's minimum energy point.

BRIEF SUMMARY OF THE INVENTION

The goal of this invention is to provide a minimum energy point tracking Buck converter by taking advantage of the particular energy consumption curve in sub-threshold region, and manipulating output voltage and duty cycle to transfer constant energy through the converter. Load energy consumption can be estimated by counting the normal on-off pulses.

The proposed solution is that the minimum energy point tracking Buck converter includes an Output Unit and a Regulating Unit. The Output Unit chops input voltage into pulses and transfers to the load after filtered. The Regulating Unit, including a Current Limit block, a Digital Control block 1 and a DAC (Digital Analog Converter) 3, regulates the output voltage. The output voltage of the Output Unit, VO, and the output voltage of the DAC 3, DAC_OUT, are compared by a comparator 8, whose output, COMP_OUT, is connected to an AND_Gate 9, with clock signal, CLK, as the other input. The output of the AND_Gate 9, CLK_REF, is connected to the S port of a RS trigger 10, and the input port of the Digital Control block. The output of the RS trigger 10 is connected to the gate port of a Power MOSFET 4 via an inverter 11a. There are two output ports of the Digital Control block. One of them determines duty cycle of the pulse through Current Limit block 2; the other is connected with DAC 3 to generate different output reference voltage. The output of Current Limit block 3, ILIM_OUT, is connected to one of the inputs of an OR_Gate 12, via an inverter 13. The other input port of OR_Gate 12 is connected to clock signal with maximum pulse width, DMAX. Its output is connected to the R port of the RS trigger 10.

The output of the RS trigger 10 is connected to the gate of the Power MOSFET 4 via an inverter.

The output of the Current Limit block 2, ILIM_OUT, possesses 6 states corresponding to 6 different duty cycles. The Current Limit block includes a PMOS 21, and a comparator 22. The source of PMOS 21 is connected to the input voltage, VIN, and its drain is connected to 6 rows of current mirrors, whose ON/OFF is corresponding to 6 different control states. The gate of PMOS 21 is connected to ground. The positive and negative inputs of the comparator 22's are connected to SW and PMOS 21's drain respectively. Its output, ILIM_OUT, is the output of the Current Limit block.

The output reference voltage, DAC_OUT, is determined by 5 digits, D<4:0>.

The DAC is consisted of an operational amplifier 23, and an N-type regulating MOSFET 24. The positive and negative inputs of the operational amplifier 23's are connected to reference voltage, VREF, and the source of MOSFET 24, which is connected to ground via 5 resistors 25~29, and a sampling resistor 30, in series. Resistors 25~29 could be shorted out corresponding to D<4:0> to generate different output reference voltage. The output of the operational amplifier 23 is connected to the gate of NMOS 24. The drain of the NMOS 24 is connected to VIN. DAC_OUT is connected to the source of NMOS 24.

The Digital Control block 1 is consisted of a Counter 31, a Comparator Unit 32 and a Lookup Table 33. Rising edge of CLK_REF, as Counter 31's input, is counted in certain period and then compared with Counter 31's output of last period, M, stored in the Comparator Unit 32. With Comparator Unit 32's output, COMP_OUT, certain I<5:0> and D<4:0> are determined according to the Lookup Table 33.

The benefit of this invention is that constant input energy can be maintained when a pulse is not skipped by manipulating output voltage and duty cycle. In that way, MEPT system is able to estimate load energy consumption by counting the pulses that is conducted. Meanwhile, with a Digital Control block, minimum energy point can be determined through a Lookup Table 3 (according to output voltage). This invention can estimate the energy consumption of the real time load without switched capacitor, and increase system's efficiency by adopting PSM control. This system is with low power consumption and small chip area benefiting from that most of the system is digital circuit.

DETAILED DESCRIPTION OF THE INVENTION

Figure 1:
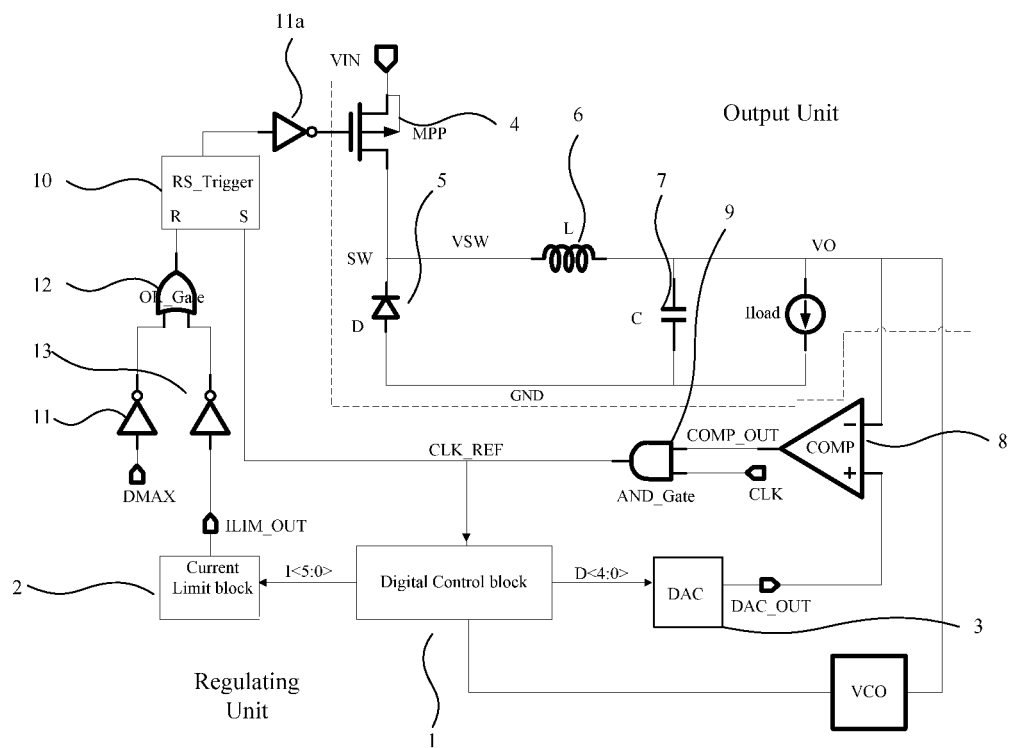
FIG. 1 is the block diagram of the system.

FIG. 1 is the block diagram showing the overall arrangement of the minimum energy point tracking Buck converter.

The system is consisted of a Digital Control block 1, a Current Limit block 2 and a DAC 3. The Digital Control block 1 counts the conducted pulses. Load minimum energy point is at the output voltage where the number of conducted pulses is minimum. Then corresponding D<4:0> and I<5:0> are determined according to the Lookup Table 33 to generate certain duty cycle and output reference voltage. The inputs of the Current Limit block 3 are connected to the I<5:0>, which are corresponding to 6 different duty cycles. DAC_OUT is determined by 5 digits, D<4:0>.

In FIG. 1, VIN, as the input of Buck converter, is connected to the source of the Power MOSFET 4. The buck converter, as the Output Unit, is consisted of a Power MOSFET 4, a diode 5, an inductor 6, and a capacitor 7. VO is connected to the negative input of a comparator 8 and compared with DAC_OUT, which is connected to the positive input port. The output of the comparator 8, COMP_OUT, and the clock signal, CLK, are both connected to an AND Gate 9. The output of the AND_Gate 9, CLK_REF, is connected to the S port of a RS trigger 10 and the input of the Digital Control block. The output of RS trigger 10 is connected to the gate of the Power MOSFET 4 via inverter 11a. There are two outputs of the Digital Control block 1. One is the current limit signal, I<5:0>; the other is the DAC signal, D<4:0>. With I<5:0> as input, the Current Limit block 2 outputs different ON time according to different input. D<4:0> determines the output reference voltage with DAC 3. The output of the Current Limit block 2, ILIM_OUT, is connected to an input of an OR_Gate 12 via inverter 13. Maxima ON time signal, DMAX, is connected to the other input of the OR_Gate 12 via another inverter. The output of the OR_Gate 12 is connected to the R port of RS trigger 10.

Figure 2:
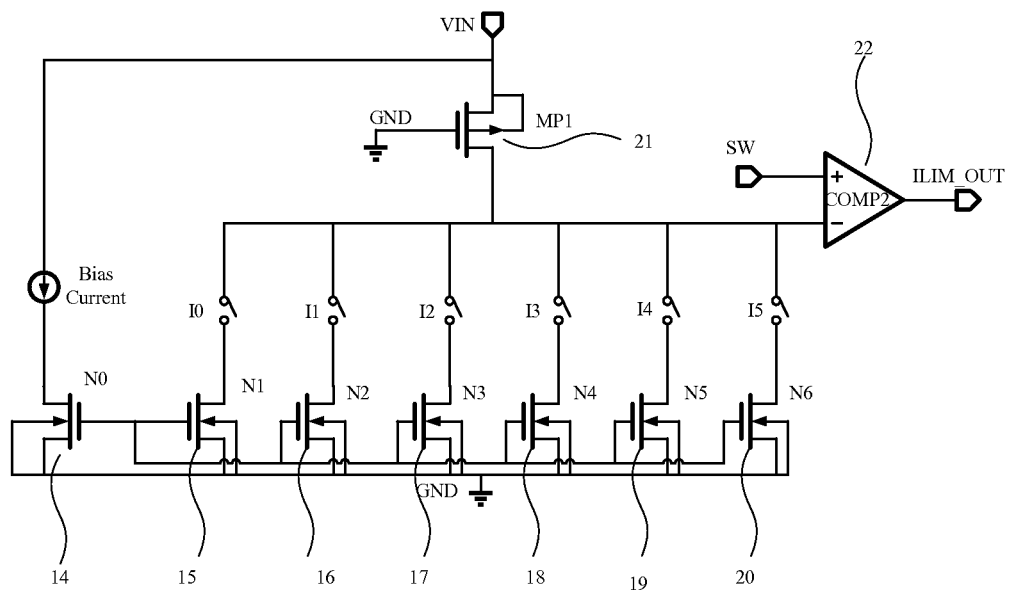
FIG. 2 is the circuit diagram showing the arrangement of the Current Limit block.

In FIG. 2, NMOSs 14~20 build up basic current mirrors. Bias current flows through NMOS 14. The sources of NMOSs 14~20 are connected to ground. The gate and the drain of NMOS 14 are connected together. The gates of NMOSs 14~20 are connected together. And, the drains of NMOSs 15~20 are connected with a switch respectively, labeled as I5, I4, I3, I2, I1 and I0 and controlled by I<5:0>. In FIG. 2, PMOS 21's gate is connected to ground with its dimension proportional to the Power MOSFET 4's. A comparator 22 outputs ILIM_OUT, with its negative input port connected to PMOS 21's drain and its positive input port connecting to Power MOSFET 4's drain.

Figure 3:
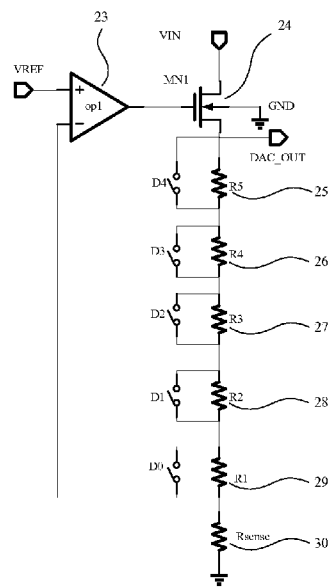
FIG. 3 is the circuit diagram showing the arrangement of the DAC (Digital-Analog Converter).

In FIG. 3, it is the circuit diagram of DAC 3. The output of the operational amplifier 23 is connected the gate of MOSFET 24, with output reference voltage as positive input. The negative input is connected to a sampling resistor 30, which is connected to ground, and the source of MOSFET 24 via 5 resistors 25~29. Resistors 25~29 could be shorted out corresponding to D<4:0> to generate different output reference voltage. The output of the operational amplifier 23 is connected to the gate of MOSFET 24. MOSFET 24's drain is connected to VIN.

Figure 4:
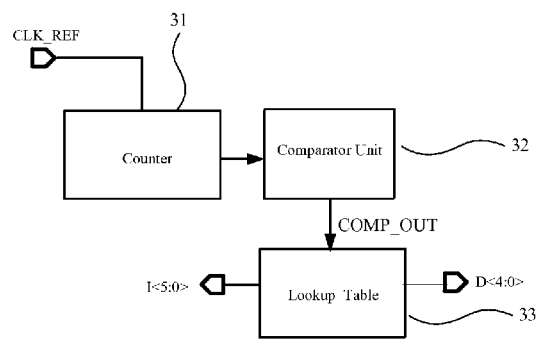
FIG. 4 is the block diagram showing the arrangement of the Digital Control block.

In FIG. 4, it shows the block diagram of the Digital Control block 1. Considering CLK_REF as input, the output of the Counter 31, N, are connected to Comparator Unit 32 and compared with register inside, M, which is the minimum N so far. The output of the Comparator Unit determines I<5:0> and D<4:0> according to Lookup Table 33.

The following is the introduction of basic principle of MEPT Buck converter and energy model based on PSM control.

Input energy of the Buck converter based on PSM control is determined by input voltage, VIN, ON time, and output voltage. It is assumed that $\Delta E_{in}$ is the input energy during each normal turning on period, $\Delta E_R$ is the energy consumption of the load every cycle, $\Delta E_L$ and $\Delta E_C$ are energies dissipated by inductor and capacitor respectively. According to law of conservation of energy, $$\Delta E_{in} = \Delta E_R + \Delta E_L + \Delta E_C \quad (1)$$

In DCM (Discontinuous conduction Mode), the energy dissipated by inductor is zero, $\Delta E_L \equiv 0$. Neglecting output voltage ripple, energy dissipated by capacitor can also be neglected. Therefore, $$\Delta E_{in} = \Delta E_R \quad (2)$$

Taking advantage of basic equilibriums of the Buck converter, the following can be obtain $$L \frac{di}{dt} = V_{IN} - V_O \Rightarrow \quad (3)$$
$$di = \frac{V_{IN} - V_O}{L} dt \Rightarrow$$
$$i = \int_0^\tau \frac{V_{IN} - V_O}{L} dt \Rightarrow \quad (4)$$
$$I_p = \frac{V_{IN} - V_O}{L} T_{on}$$

From equation (3) and (4), $$\Delta E_{in} = \frac{1}{2L} T_{on}^2 (V_{IN} - V_O) V_{IN} \quad (5)$$

The following equation can also be obtained:

$$\Delta E_{in} = \frac{L}{2} I_p^2 \frac{V_{IN}}{(V_{IN} - V_O)} \quad (6)$$

From equation (5) and (6), in order to maintain constant energy input, with constant $V_{IN}$ and L, $$T_{on}^2 (V_{IN} - V_O) \text{ and } \frac{I_P^2}{(V_{IN} - V_O)}$$

should be constant, out of which $I_p$ is inductor current peak.

Assuming the normal on-off and skipped periods of the proposed Buck converter are M and N respectively, the input energy is M $\Delta E_{in}$. According to different output voltage, with certain current peak or ON time, the input energy of each pulse can be maintained constant. In that way, with constant input energy of each pulse, load's energy consumption can be estimated by counting conducted pulses.

With certain algorithm, MEPT system could search for the minimum energy point effectively.

Figure 5:
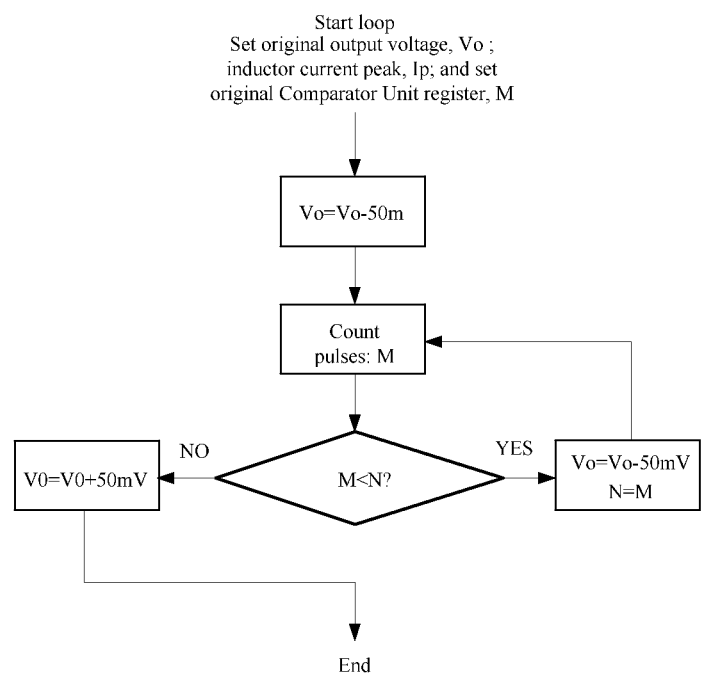
FIG. 5 is the timing chart showing the operation of the minimum energy point tracking system.

In FIG. 5, at the beginning of the algorithm, original output reference voltage and corresponding current limit are set to insure the input energy of each pulse constantly. During the first algorithm period, system counts the pulses conducted, N. At the beginning of second period, output reference voltage reduces 50 mV and current peak limit is adapted to keep the input energy of each pulse constantly. Then, conducted pulses, M are counted. If M is less than N, the output reference voltage is reduced another 50 mV, current peak limit is adjusted correspondingly, and normal conducted pulses are counted again. If M is larger than N, the output reference voltage is raised 50 mV, current peak limit is adjusted correspondingly. At this output voltage, it is the minimum energy point of the system. Algorithm ends and output voltage is fixed.

In current peak limit block, voltages at drains of POWER MOSFET 4 and PMOS 21 are compared. POWER MOSFET 4 is power PMOS, and PMOS 21 is a PMOS, whose current is the sum of I0~I5. In that way, POWER MOSFET 4's current peak is determined In FIG. 2, NMOSs 14~20 form basic current mirrors and NMOSs 15~20 copy current through NMOSs 14. For PMOS 21 and POWER MOSFET 4, it is assumed that $K(W/L)_{P1}=(W/L)_{PPMOS}$. Since PMOS 21 and POWER MOSFET 4 both are in deep linear region, the following is their conduction resistance:

$$P_{MP1} = \frac{1}{\mu_P C_{ox} \left(\frac{W}{L}\right)_{P1} (V_{IN} - V_{con} - V_{th})} \quad (7)$$

$$R_{MPP} = \frac{1}{\mu_P C_{ox} \left(\frac{W}{L}\right)_{PPMOS} (V_{IN} - V_{con} - V_{th})} \quad (8)$$

$$= \frac{\left(\frac{1}{K}\right)}{\mu_P C_{ox} \left(\frac{W}{L}\right)_{P1} (V_{IN} - V_{con} - V_{th})}$$

From above equation (7) and (8), the conduction resistance of PMOS 21 and POWER MOSFET 4 is proportional to W/L. Therefore, $R_{MP1}$ is K times of $R_{MPP}$. In FIG. 2, with another assumption, that current through NMOSs 15~20 is m times of current through NMOSs 14, the voltage at the negative input of comparator 22 is:

$$V_- = V_{IN} - mI_{BIAS} R_{P1} \quad (9)$$

The positive input of comparator 22 can be expressed as inductor current multiplied with conduction resistance:

$$V_+ = V_{IN} - I_L R_{PPMOS} \quad (10)$$

From equation (9) and (10), current peak limit block manipulates ON time by controlling inductor current peak. As inductor current is rising, $V_+$ falls from $V_{IN}$ definitely. When $V_+$ is higher than $V_-$, comparator 22 outputs high and POWER MOSFET 4 maintain conduction. $V_+$ falls as inductor current rises. When $V_+$ is lower than $V_-$, comparator 22 outputs low and POWER MOSFET 4 turns off. In that way, ON time is manipulated. When $V_+ = V_-$, $$mI_{BIAS} R_{P1} = I_L R_{PPMOS} \quad (11)$$

As $R_{MP1}$ is K times of $R_{MPP}$, POWER MOSFET 4 turns off when $I_L = KmI_{BIAS}$, in which m is the only variable. In FIG. 2, m is determined by I<5:0>. In that way, ON time can be manipulated by controlling $I_L$ with I<5:0>.

In FIG. 3, basically, the proposed DAC 3 is an amplifier with programmable number of resistors, 25~29, in series.

With negative input of operational amplifier 23 is clamped to $V_{REF}$, then $$\frac{V_{DAC\_OUT} - V_{REF}}{R} = \frac{V_{REF}}{R_s} \quad (12)$$

where R is the total resistance of resistors, 25~29. Furthermore, $$V_{DAC\_OUT} = V_{REF}\left(1 + \frac{R}{R_{sense}}\right) \quad (13)$$

where R is determined by D<4:0>. Therefore, the output voltage of DAC 3 is determined by D<4:0>, too.

In FIG. 4, Clk_REF is sensed and processed in the Digital Control block 1. Firstly, Clk_REF is sampled by counting rising edge during certain period. The outputs of Counter 31 are sent to Comparator Unit 32, where comparing the outputs of this period to that of the last period. After starting up, the system sets output of Counter 31 maximum to make sure that the system could track minimum energy point further. After comparing, according to the result, I<5:0> and D<4:0> of next period should be determined in the Lookup Table 33 below.

The following is Lookup Table 1 effective in the system.

LOOKUP TABLE 1

| DAC_OUT | IP | D<4:0> | I<5:0> |
|---|---|---|---|
| V1 | I1 | 00001 | 000001 |
| V2 | I2 | 00010 | 000010 |
| V3 | I3 | 00011 | 000011 |
| V4 | I4 | 00100 | 000100 |
| V5 | I5 | 00101 | 000101 |
| V6 | I6 | 00110 | 000110 |
| V7 | I7 | 00111 | 000111 |
| V8 | I8 | 0100 | 001000 |

In the table above, V1-V8 and I1-I8 are following the equation:

$$\Delta E_{in} = \frac{L}{2} I_p^2 \frac{V_{IN}}{(V_{IN} - V_O)} \quad (14)$$

In FIG. 1, when starting up, the states of DAC 3 and Current Limit block 2 are unknown. D<4:0> and I<5:0> are set to be 00001 and 000001 respectively. If VO is higher than DAC_OUT, comparator 8's output and Clk_ref are both low. At this time, the RS trigger 10 outputs high, POWER MOSFET 4 turns off. In that way, one pulse is skipped. If VO is lower than DAC_OUT, the outputs of comparator 8 and Clk_ref are high and that of RS trigger 10 is low. POWER MOSFET 4 turns on, and VSW falls as inductor current rises. When inductor current meets current limit set by Current Limit block 2, ILIM_OUT turns low and shuts off POWER MOSFET 4. If ON time set by the Current Limit block 2 is larger than DMAX (much larger than clock pulse), the on-off state of POWER MOSFET 4 is determined by DMAX. During the counting period, Counter 31 counts Clk_ref's rising edge. The algorithm is executed until minimum energy point is found between V2 and V8, where Counter 31's output is larger than the last. Then VO is set to be the previous voltage and the algorithm ends.

What is claimed is:
1. A minimum energy point tracking buck converter comprising an output unit and a regulating unit, an input voltage chopped by the output unit of switching power supply circuit into pulses that are transferred to a load, the regulating unit senses and regulates the output voltage, the regulating unit including a current limit block, a digital control block and a DAC, a comparator comparing an output voltage and an output reference voltage, the comparator having an output and clock signal connected as inputs of an AND gate, the AND gate having an output connected as an S port of a RS trigger and an input of the digital control block the digital control block having a first output that determines an ON time by controlling the current limit block, the digital control block having a second output that determines the output reference voltage with the DAC, a first inverter connecting an OR gate to an output of the current limit block, and a second inverter connecting the OR gate to a maximum duty cycle signal, the OR gate having an output connected to an R port of the RS trigger.

2. The minimum energy point tracking buck converter of claim 1, the RS trigger having an output connected to a power MOSFET via an inverter.

3. The minimum energy point tracking buck converter of claim 2, wherein the output of the current limit block possesses six output states corresponding to six different duty cycles.

4. The minimum energy point tracking buck converter of claim 3, the current limit block including a PMOS and a comparator, the PMOS having a source connected to the input voltage, the PMOS having a drain connected to six rows of current mirrors with ON/OFF states corresponding to the six output states, the PMOS having a gate connected to ground, the comparator having positive and negative inputs connected to the drains of the power MOSFET and the PMOS, respectively, and the output of the comparator output is the output of the current limit block.

5. The minimum energy point tracking buck converter of claim 4, wherein the DAC is determined by five digits.

6. The minimum energy point tracking buck converter of claim 5, wherein the DAC includes an operational amplifier and a regulation MOSFET, the operational amplifier having positive and negative inputs connected to reference voltage, VREF, and a source of the regulation MOSFET, is the source of the regulation MOSFET being connected to ground via five resistors and a sampling resistor, the 5 resistors capable of being shorted out to generate a different output reference voltage, the different output reverence voltage being connected to the source of the operational amplifier.

7. The minimum energy point tracking buck converter of claim 1, the digital control including a counter, a comparator unit and a look-up table, the counter having an input with a rising edge counted in a period and compared with an output of the counter in a last prior period, that is stored in the comparator unit resulting in an output of the comparator unit to determine certain current limit signals and DAC signals according to the look-up table.

8. The minimum energy point tracking buck converter of claim 1, wherein the output of the current limit block possesses six output states corresponding to six different duty cycles.

9. The minimum energy point tracking buck converter of claim 8, wherein the DAC is determined by five digits.

10. The minimum energy point tracking buck converter of claim 9, wherein the DAC includes an operational amplifier and a regulation MOSFET, the operational amplifier having positive and negative inputs connected to reference voltage, VREF, and a source of the regulation MOSFET, is the source of the regulation MOSFET being connected to ground via five resistors and a sampling resistor, the 5 resistors capable of being shorted out to generate a different output reference voltage, the different output reverence voltage being connected to the source of the operational amplifier.

* * * * *